(12) United States Patent
Karam et al.

(10) Patent No.: US 12,212,456 B2
(45) Date of Patent: Jan. 28, 2025

(54) PRE-PROVISIONING SERVER HARDWARE FOR DEPLOYMENT ON AN EDGE NETWORK

(71) Applicant: Microsoft Technology Licensing, LLC, Redmond, WA (US)

(72) Inventors: Paul Karam, Kirkland, WA (US); Humayun Mukhtar Khan, Issaquah, WA (US); Arpan Kumar Asthana, Bothel, WA (US); Alphonse Kurian, Bellevue, WA (US); Amit Kumar Saraff, Seattle, WA (US); Chandrasekhar Pasupuleti, Issaquah, WA (US); Rohan Matthew Augustus, Bothel, WA (US); Run Fang, Shanghai (CN)

(73) Assignee: Microdoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/280,431

(22) PCT Filed: Mar. 3, 2022

(86) PCT No.: PCT/US2022/018764
§ 371 (c)(1),
(2) Date: Sep. 5, 2023

(87) PCT Pub. No.: WO2022/187531
PCT Pub. Date: Sep. 9, 2022

(65) Prior Publication Data
US 2024/0154862 A1  May 9, 2024

(30) Foreign Application Priority Data
Mar. 3, 2021 (NL) ..................... 2027692

(51) Int. Cl.
H04L 41/0806 (2022.01)
H04L 41/08 (2022.01)
H04L 41/0895 (2022.01)

(52) U.S. Cl.
CPC ...... *H04L 41/0806* (2013.01); *H04L 41/0889* (2013.01); *H04L 41/0895* (2022.05)

(58) Field of Classification Search
CPC ............ H04L 41/0806; H04L 41/0895; H04L 41/0889; H04L 67/34
See application file for complete search history.

(56) References Cited

U.S. PATENT DOCUMENTS

| 7,551,971 B2 | 6/2009 | Hillis et al. |
| 8,116,080 B2 | 2/2012 | Wormsbecher et al. |

(Continued)

OTHER PUBLICATIONS

"AWS Snowball", Retrieved From: https://aws.amazon.com/snowball/?whats-new-cards.sort-by=item.additionalFields.postDateTime&whats-new-cards.sort-order=desc, Retrieved From: Nov. 23, 2020, 7 Pages.

(Continued)

*Primary Examiner* — Chirag R Patel
(74) *Attorney, Agent, or Firm* — Ray Quinney & Nebeker; James Bullough

(57) ABSTRACT

The present disclosure relates to systems, methods, and computer-readable media for pre-provisioning server nodes of a server rack and causing the pre-provisioned server node to be deployed on an edge zone of a cloud computing system. In particular, systems described herein involve identifying server nodes based on a customer hardware deployment request and performing a series of pre-provision acts to the server nodes in accordance with the received hardware deployment request. For example, systems described herein pre-provision the hardware by configuring hardware and software on the server nodes, establishing communication with one or more control planes on a datacenter, and (Continued)

bringing the server nodes to a return to web (RTW) state. By pre-provisioning the hardware, the server hardware may be delivered and transitioned to a live state in an efficient manner and without jeopardizing security on the cloud.

20 Claims, 7 Drawing Sheets

(56) References Cited

U.S. PATENT DOCUMENTS

| | | | |
|---|---|---|---|
| 8,238,082 | B2 | 8/2012 | Salpeter |
| 10,938,855 | B1 | 3/2021 | Waldie et al. |
| 11,258,661 | B2* | 2/2022 | Jiang ................ H04L 67/34 |
| 11,388,054 | B2* | 7/2022 | Guim Bernat .......... H04L 49/70 |
| 2006/0031476 | A1 | 2/2006 | Mathes et al. |
| 2006/0159014 | A1* | 7/2006 | Breiter ................ H04L 41/0806 370/229 |
| 2016/0011894 | A1 | 1/2016 | Reddy et al. |
| 2017/0086325 | A1* | 3/2017 | Connor ................ H05K 7/1488 |
| 2017/0149880 | A1 | 5/2017 | Lochhead et al. |
| 2019/0097900 | A1* | 3/2019 | Rodriguez .......... G06F 11/1484 |
| 2019/0260641 | A1* | 8/2019 | Giust .................... H04L 67/141 |
| 2020/0092166 | A1* | 3/2020 | Sharma ................. H04L 63/102 |
| 2020/0310394 | A1* | 10/2020 | Wouhaybi ........... H04L 67/1051 |

OTHER PUBLICATIONS

"Dell Services Server Implementation", Retrieved From: https://i.dell.com/sites/csdocuments/Shared-Content_data-Sheets_Documents/en/ie/Services-Servers-Server-Implementation-Datasheet-English.pdf, Retrieved From: Nov. 23, 2020, 2 Pages.

"HPE G2 Advanced Series Racks", Retrieved From: https://buy.hpe.com/in/en/rack-power-infrastructure-products/racks/c/3446288, Retrieved From: Nov. 23, 2020, 2 Pages.

Boguniewicz, Karol, "VMware Cloud Foundation on Dell VxRail", In Dell EMC Technical White Paper of Dell EMC, Apr. 2023, 74 Pages.

"Search Report and Written Opinion Issued in Netherland Application No. N2027692", Mailed Date: Nov. 17, 2021, 12 Pages.

"International Search Report and Written Opinion Issued in PCT Application No. PCT/US22/018764", Mailed Date: May 12, 2022, 13 Pages.

* cited by examiner

PRE-PROVISIONING SERVER HARDWARE FOR DEPLOYMENT ON AN EDGE NETWORK

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide storage and computing functionality to various clients and customers. These virtual services can be hosted by respective server nodes on a cloud computing system.

As demand for cloud computing resources continues to grow, and as the demographic of cloud computing users has become more decentralized, additional innovations are needed to meet this change in demand. For example, conventional cloud computing systems have experienced significant costs and challenges in scaling centrally maintained cloud computing datacenters to accommodate a growing user-base. In addition, users may often experience latency issues and demand more speed than can be provided by a remote cloud computing system. Moreover, many individuals and businesses prefer greater control and/or security of cloud computing resources over conventional models in which cloud computing resources are shared between multiple tenants.

In an attempt to overcome various drawbacks and/or shortcomings of conventional cloud computing systems, conventional cloud computing providers have implemented edge networks that enable devices to interface with the cloud in a variety of way. Deployment of these edge networks, however, pose a number of difficulties and challenges. As an example, because these cloud-based services leverage one or more capabilities of a cloud computing system, administrators of the cloud computing system typically deliver and deploy the edge hardware on location of the edge network. While this local delivery and careful deployment can avoid lapses in network security and provide more reliable cloud-based services, physically delivering and installing edge computing resources is typically an involved and long process that takes days and weeks to deliver and configure within the framework of a customer network. As a result, customers often become frustrated with long periods of downtime in which edge computing resources are not available.

These and other problems exist with regard to delivering cloud computing resources to edge networks.

DETAILED DESCRIPTION

Figure 1:
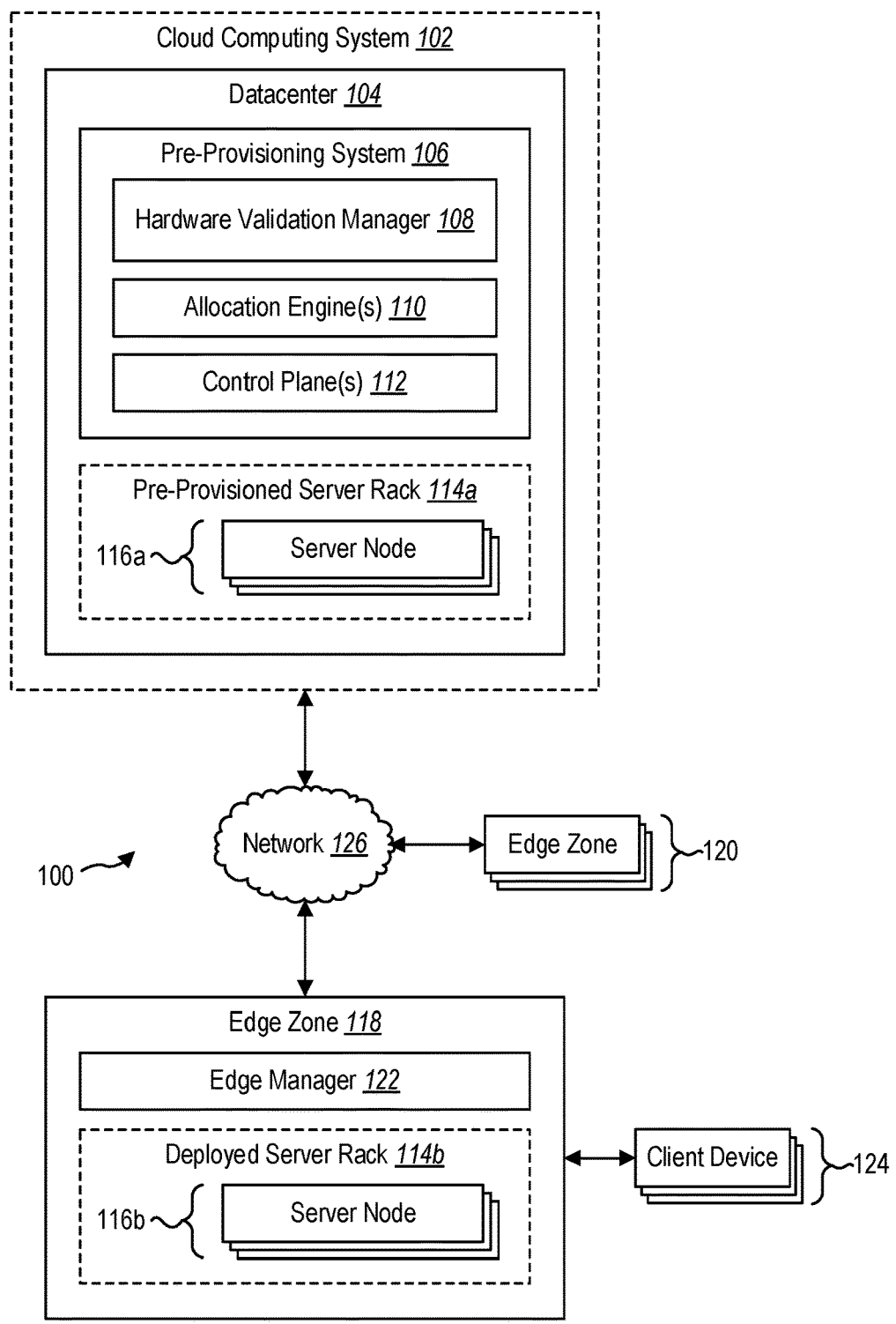
FIG. 1 illustrates an example environment of a pre-provisioning system for pre-provisioning and deploying server hardware on a local edge network in accordance with one or more embodiments.

The present disclosure is generally related to pre-provisioning server nodes of a server rack prior to delivery of the server rack to a location of an edge zone. For example, a pre-provisioning system may be implemented to facilitate preparing and configuring a server rack prior to delivering the server rack to a location of the edge zone. As will be discussed in further detail below, this may involve identifying and provisioning storage nodes, compute nodes, and network nodes on a server rack in accordance with a received customer request. In addition, the pre-provisioning system may establish a connection with one or more control planes that will be tasked with managing virtual machines and other services deployed on the server rack after deployment via a location of the edge zone.

In one or more embodiments, the pre-provisioning system may provision and pre-configure any number of hardware devices (e.g., server nodes) short of exposing the computing resources to an allocation engine or otherwise facilitating deployment of virtual machines (or other cloud-based services) on the server rack. For instance, the pre-provisioning system may pre-provision server hardware to a "release to web" (RTW) state in which server nodes are ready for deployment as soon as the server node(s) are exposed to an allocation engine on the cloud computing system that is configured to allocate computing resources to accommodate various services. As will be discussed below, pre-deploying the hardware in accordance with one or more embodiments described herein may facilitate a fast and reliable deployment of the server rack on a local edge network within a matter of hours after physical delivery of the server rack to a location of the edge network.

As an illustrative example, a pre-provisioning system may receive a hardware deployment request for deployment of cloud hardware (e.g., a server rack) to an edge zone associated with a regional datacenter of a cloud computing system. The pre-provisioning system may pre-provision a server rack for the edge zone by pre-provisioning a set of storage nodes, compute nodes, and network nodes in accordance with the deployment request. The pre-provisioning system may further establish a network connection with one or more control planes implemented internal to the regional datacenter to establish that the server rack will operate as designed within the hierarchy of the cloud computing system. The server rack may then be disconnected from the control plane and delivered to a location of the edge zone for deployment of the server rack at the location of the edge zone. In particular, the server rack may be deployed via an external network (e.g., a customer network) from the regional datacenter by re-establishing a connection with the control plane(s) and exposing the storage and/or computing nodes to an allocation engine in the regional datacenter configured to allocate virtual machines and other services to hardware of the server rack.

As will be discussed in further detail below, the present disclosure includes a number of practical applications having features described herein that provide benefits and/or solve problems associated with delivering server hardware for deployment on an edge network. Some example benefits are discussed herein in connection with various features and functionality facilitated by a pre-provisioning system. Nevertheless, it will be understood that benefits explicitly discussed in connection with one or more implementations are provided by way of example and are not intended to be a comprehensive list of all possible benefits of the pre-provisioning system.

For example, by pre-provisioning the hardware components (e.g., the server nodes) of the server rack prior to delivering and deploying the server rack on the edge network, the pre-provisioning system enables a server rack to provide storage, computing, and network capacity within a condensed period of time after delivery of the hardware to a location of the edge network. Indeed, by performing various provisioning tasks offline (e.g., prior to delivery and bringing the server to a live state) such as loading firmware, installing operating systems, and configuring the hardware on the server rack to communicate with components of the cloud computing system, the pre-provisioning system can significantly reduce the amount of time that it takes to deploy the server rack and provide live capacity to users of the cloud computing system associated with the edge network.

In addition to reducing time associated with delivery and bringing the hardware live, the pre-provisioning system can additionally ensure that the hardware on the server rack is healthy and operates as designed within an internal framework of the cloud computing system (e.g., an internal network of a datacenter). For example, by establishing communication between hardware components of the server rack (e.g., networking nodes, storage nodes, compute nodes) with one or more control planes that are internal to a regional datacenter, the pre-provisioning system can ensure that the hardware components will behave as designed in leveraging features and functionalities of the server hardware as well as services provided by internal components of the cloud computing system. This process can be done offline and prior to delivery, further accelerating the time between delivery and providing live resource capacity to end-users of the cloud computing system.

The pre-provisioning system may additionally provide features and functionality to enhance security of the hardware and the cloud computing system in the event that the hardware fails to arrive at the target destination or to avoid any tampering with the hardware during shipment to the location of the edge network. Indeed, where conventional cloud computing providers are generally hesitant to provide hardware that has access to internal assets of a cloud computing system to an external location, the one or more embodiments of the pre-provisioning system include security features that ensure the pre-provisioned hardware does not pose a significant security risk to other tenants or to the cloud computing system itself. For example, in one or more embodiments, the pre-provisioning system pre-configures the hardware based on information about the edge network collected prior to delivery of the hardware to the edge network location. As another example, in one or more embodiments, the pre-provisioning system makes use of a proxy system that authenticates credentials, authorizes access to the regional cloud resources, or otherwise verifies the location and security of the delivered hardware prior to providing access to the control plane(s), allocation engine, and other internal components on the cloud computing system. Implementation of the proxy system can provide an extra layer of protection to the cloud computing system from any compromised edge location by shutting down any malicious request to the cloud and by quarantining the suspicious edge site.

As illustrated in the foregoing discussion, the present disclosure utilizes a variety of terms to describe features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments, the server devices may be implemented within a datacenter (e.g., a regional datacenter) including any number of server devices connected via an internal network of the datacenter and which provides any number of cloud computing services to clients of the cloud computing system. In one or more embodiments described herein, a cloud computing system includes a combination of multiple datacenters in addition to one or more edge zones extending computational resources of the cloud computing system beyond those provided exclusively within the datacenter(s).

In one or more embodiments described herein, a cloud computing system may include one or more edge zones. As used herein, an "edge zone" or "edge network" may refer interchangeably to an extension of the cloud computing system located on a periphery of the cloud computing system. The edge zone may refer to a hierarchy of one or more devices that provide connectivity to the cloud computing system to one or more clients connected to or on the same communication network as the edge zone. The edge zone may provide a number of cloud computing services on local hardware without requiring that a client communicate with components internal to a cloud computing system. In one or more embodiments, the edge zone provides a virtual access point that enables more direct communication with one or more components on the cloud computing system than another entry point, such as a public entry point, to the cloud computing system.

In one or more embodiments described herein, the edge zone is associated with a specific datacenter (e.g., a regional datacenter) based on a location of the edge zone within an external network or physical proximity of the edge zone relative to the datacenter. This regional datacenter can serve as a parent for the edge zone and may be selected for a corresponding edge zone based on a low latency the regional datacenter provides to the edge zone as well as the data sovereignty the datacenter ensures within the geography. In one or more embodiments, the edge zone includes a combination of cloud computing hardware provided by and configured to operate in connection with the cloud computing system in combination with additional hardware that is separate from or otherwise independent from the cloud computing system. For example, in one or more embodiments, a pre-provisioned server rack may refer to server nodes that are configured to operate in connection within the hierarchy of a cloud computing system and physically installed within an external network including one or more server devices that are not in communication with or otherwise configured to communicate internally with components of the cloud computing system.

As used herein, a "pre-provisioned server rack" may refer to a set of pre-provisioned hardware (e.g., server nodes) that is selected and configured based on a received customer request for cloud computing hardware. For example, a pre-provisioned server rack may have cloud computing hardware installed thereon including, by way of example, a set of server nodes of various types. For instance, server nodes may refer to compute nodes (e.g., a set of server nodes that are configured to host virtual machines that provide computing or processing services), storage nodes (e.g., a set of server nodes that are configured to host virtual machines that provide storage services), and networking nodes (e.g., a set of server nodes that provide networking features and/or connectivity between clients and server devices on the cloud computing system).

As will be discussed in further detail below, a pre-provisioned server rack may include any number of hardware components that have been pre-configured in a variety of ways leading up to (though not including) exposure of the hardware components to an allocation engine on the cloud computing system. For example, a pre-provisioned server rack may include pre-provisioned server nodes on which operating systems have been installed, firmware has been configured, and which have previously established communication with a control plane on the cloud computing system to verify operability within a datacenter. Indeed, a pre-provisioned server rack may include hardware that has been configured for normal operation on the edge network and that has been verified as operational and healthy within an internal framework of the cloud computing system, but that has not been exposed to one or more allocation engines of the cloud computing system.

Additional detail will now be provided regarding to systems mentioned above in relation to illustrative figures portraying example implementations. For example, FIG. 1 illustrates an example environment 100 showing a cloud computing system 102 including a datacenter 104 and a plurality of edge zones 118, 120. As shown in FIG. 1 the datacenter 104 includes a pre-provisioning system 106 implemented thereon. The cloud computing system 102 may include any number of datacenters (e.g., regional datacenters) spaced across multiple geographic locations. Further, the datacenter 104 (and any additional datacenters) may include any number of server devices configured to provide various features and functionalities of the cloud computing system to any number of client devices (e.g., client devices 124) in communication with the cloud computing system 102. In addition, while FIG. 1 illustrates a cloud computing system 102 as inclusive of the datacenter 104; in one or more embodiments, the cloud computing system 102 may refer to the datacenter 104 in addition to one or more devices of a plurality of edge zones (discussed below).

As shown in FIG. 1, the pre-provisioning system 106 may include a number of components for performing features and functionality described herein. For example, the pre-provisioning system 106 may include a hardware validation manager 108. The hardware validation manager 108 may receive and process a customer request including information associated with delivery of a server rack to a customer. For example, the hardware validation manager 108 can receive a request including information associated with a quantity of processing, storage, and/or networking specifications that should be delivered via an edge network accessible to an external network from the cloud computing system.

The hardware request may include any information associated with a customer including a customer identifier, a location of an edge network, and any customer data (e.g., customer metadata) descriptive of the customer and/or network. For example, the customer request may include an indication of network credentials, internet protocol (IP) addresses, device identifiers, or any information needed to obtain access to devices on the external network (or to provide cloud access to the devices on the external network). The hardware validation manager 108 may use the information from the hardware request to map allocation requests to corresponding hardware associated with the customer including, for example server nodes on the server rack. The hardware validation manager 108 may additionally utilize the information from the request to identify specific instances of hardware (e.g., stock keeping units (SKUs), hardware generations) for inclusion within one or more server racks.

As shown in FIG. 1, the pre-provisioning system 106 may include one or more allocation engine(s) 110. The allocation engine(s) 110 may include one or more server devices configured to allocate computing, storage, and/or networking capacity responsive to received customer requests (e.g., service requests) received after the server hardware is up and running and exposed as an eligible resource to the allocation engine(s) 110. For example, and as will be discussed in further detail below, the allocation engine(s) 110 can allocate resources on a server rack deployed on the edge network responsive to one or more requests to deploy virtual machines (or other cloud-based services) on the cloud computing system 102.

As further shown in FIG. 1, the pre-provisioning system includes one or more control plane(s) 112. The control plane(s) 112 may include hardware and/or software for managing operation of server nodes and/or cloud-based services that are deployed on an edge network. For example, in one or more embodiments, the control plane(s) 112 includes instructions for how to route communication packets between external server nodes on the edge network (e.g., server nodes on a server rack) and internal server nodes implemented within an internal network of the datacenter 104.

As mentioned above, and as shown in FIG. 1, the pre-provisioning system 106 may facilitate generation of and pre-provisioning of a server rack responsive to a hardware request from a customer. In particular, as shown in FIG. 1, the pre-provisioning system 106 may facilitate generation of a pre-provisioned server rack 114a to be implemented within an internal network of the datacenter 104. As discussed above, and as shown in FIG. 1, the pre-provisioning system 106 may include a plurality of server nodes 116a (pre-provisioned server nodes). As will be discussed in further detail in connection with FIGS. 2A-2B, the server nodes 116a may include a set of one or more network nodes, a set of one or more storage nodes, and a set of one or more compute nodes. While not shown in FIG. 1, the pre-provisioning system 106 may include any number of additional nodes and hardware components to enable the respective server nodes 116a to communicate with and operate in connection with other components of the cloud computing system 102. In addition, and as will be discussed in further detail below, a proxy system may exist between the datacenter 104 and the various edge zones 118, 120 to provide more security to the pre-provisioning system 106 and to protect the cloud computing system 102 from any malicious attack coming from a compromised edge zone 118,120.

After a pre-provisioning stage in which the pre-provisioned server rack 114a is connected to the control plane(s) 112 and health and proper functionality of the server nodes 116a are verified, the pre-provisioned server rack 114a may be disconnected from the internal network of the datacenter 104 (e.g., disconnected from the control plane(s) 112) and relocated to a location of an edge zone 118. As shown in FIG. 1, the edge zone 118 may include an edge manager 122 (e.g., a network manager or network administrator) and the pre-provisioned server rack 114b having the pre-provisioned server nodes 116b implemented within an external network from the datacenter 104.

As shown in FIG. 1, the edge manager 122 may manage connectivity between the pre-provisioned server rack 114b and other components in communication with the edge zone 118. For example, the edge manager 122 may refer to a computing device or server device accessible by an administrator of the edge zone 118 to manage access to hardware components of the pre-provisioned server rack 114b by a set of client devices 124 on an external network having access to the edge zone 118. In one or more embodiments, the edge manager 122 refers to a client device (or software program on the client device) having administrator permissions to other devices on an external network on which the edge zone 118 will be implemented.

As will be discussed in further detail below, the edge manager 122 may perform a series of checks and/or validations as part of the process for deploying the server rack 114b on the edge zone 118. For example, the edge manager 122 may perform a series of validations and checks to transition a state of the server rack 114b from an "out for repair" state to a "live" state.

As shown in FIG. 1, a set of client devices 124 may communicate with components of the cloud computing system 102 via the edge zone 118. In particular, the client devices 124 may provide requests for deployment of virtual machines and other cloud-based services to be hosted on the edge zone 118 and/or on the datacenter 104. The client devices 124 may refer to various types of computing devices including, by way of example, mobile devices, desktop computers, server devices, or other types of computing devices.

As further shown in FIG. 1, devices of the edge zone 118 may communicate with the cloud computing system 102 via a network 126. The network 126 may include one or multiple networks that use one or more communication platforms or technologies for transmitting data. For example, the network 126 may include the Internet or other data link that enables transport of electronic data between respective client devices 124 and devices of the cloud computing system 102 and/or edge zone 118. In some cases, network 126 includes a virtual private network (VPN) and/or a virtual extensible local area network (VXLAN) network connection built on top of the customer network to link the edge zone 118 to the cloud computing system 102.

As shown in FIG. 1, the environment 100 may include additional edge zones 120 corresponding to different locations and/or different clients/customers. Each of the edge zones 120 may include similar features and functionality discussed in connection with the edge zone 118 (and other edge zones discussed herein). The datacenter 104 may be associated with any number of edge zones having similar or different combinations of server nodes on respective server racks (e.g., in accordance with received hardware requests indicating different virtual machine types and/or computing requirements).

Figure 2A:
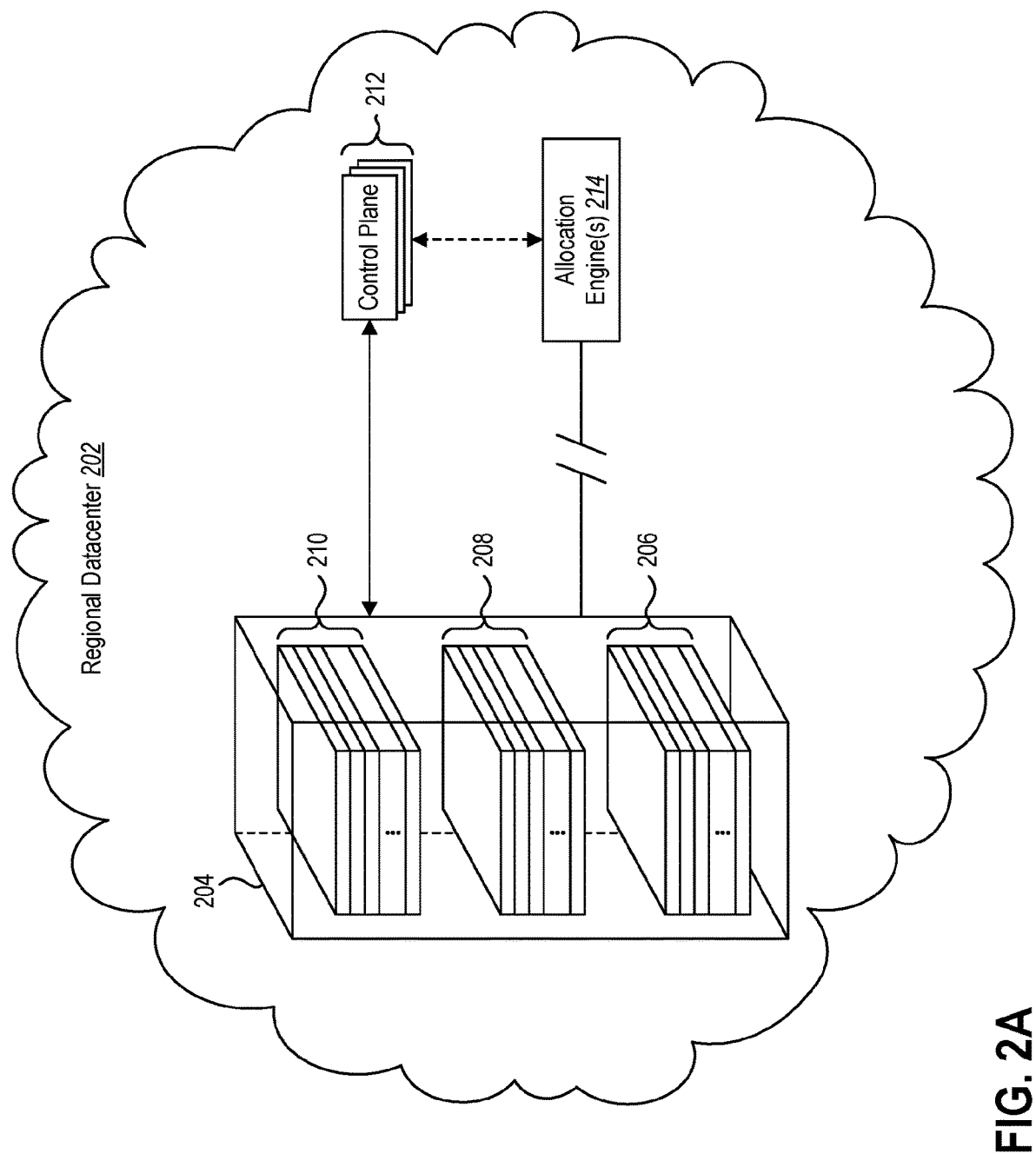
FIG. 2A illustrates an example implementation of pre-provisioning a server rack prior to delivery to a location of a local edge network in accordance with one or more embodiments.
Figure 2B:
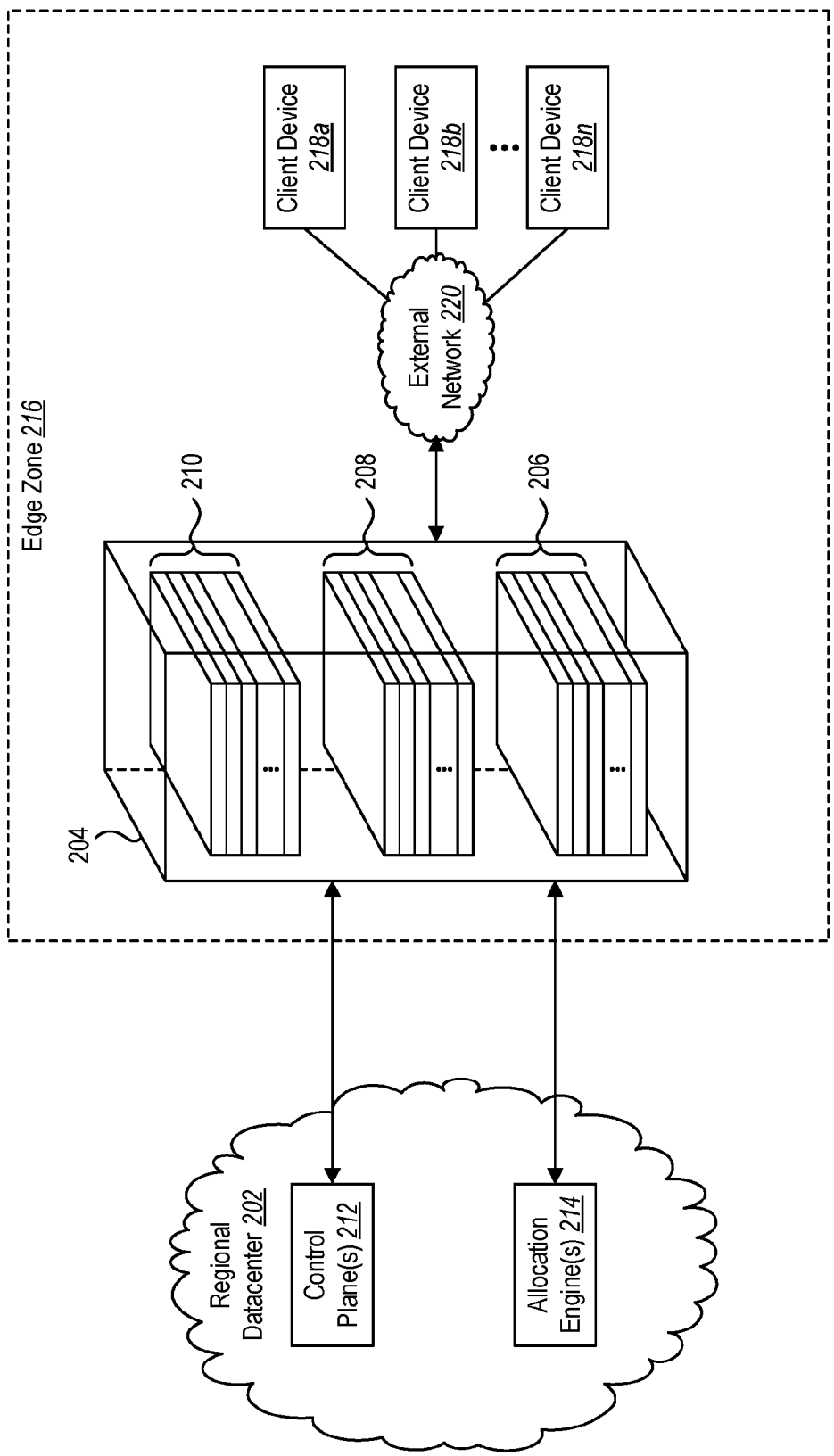
FIG. 2B illustrates an example implementation of deploying a pre-provisioned server rack on a local edge network in accordance with one or more embodiments.

Additional information will now be discussed in connection with an example implementation of pre-provisioning and deploying a server rack in accordance with one or more embodiments described herein. In particular, FIGS. 2A-2B illustrate an example implementation in which a server rack is pre-provisioned within a datacenter and delivered for deployment on an edge zone that is an extension of the datacenter. In particular, FIG. 2A illustrates an example implementation of a server rack 204 based on a received hardware request and in which the pre-provisioning system 106 has identified any number of server nodes (e.g., server nodes 116a) to include within a housing of the server rack 204.

For example, FIG. 2A illustrates an example regional datacenter 202 including a pre-provisioned server rack 204 in accordance with one or more embodiments. Responsive to a hardware deployment request, the pre-provisioning system 106 can identify hardware to include within a housing of a server rack 204 as discussed above in connection with FIG. 1. For example, the pre-provisioning system 106 can identify any number of server nodes based on requested virtual machine types, requested computing and/or storage capacity, or other information indicating a quantity of computing resources to include within the server rack 204. The pre-provisioning system 106 can additionally identify quantities and types of server nodes based on specifications of a client network (e.g., an edge network, external network).

As shown in FIG. 2A, the pre-provisioning system 106 can identify different types of server nodes based on information from the hardware deployment request. As an illustrative example, the pre-provisioning system 106 can identify a set of storage nodes 206 having data storage capacity in accordance with the hardware deployment request. As further shown, the server rack 204 may include a set of compute nodes 208 that provide computing capacity to clients of the cloud computing system via an edge network. In one or more embodiments, the pre-provisioning system 106 can identify specific SKUs and generation types of the server nodes based on information from the hardware deployment request.

As further shown in FIG. 2A, the pre-provisioning system 106 can identify a set of network nodes 210 that provide connectivity between devices on an external network to devices on the server rack 204 and/or the regional datacenter 202. For example, the set of network nodes 210 may include a variety of switches and/or routers having any number of ports to facilitate communication of data between devices of the server rack 204 as well as between devices on and off the cloud computing system 102.

While not shown in FIG. 2A, the server rack 204 may include additional hardware components in addition to the storage, compute, and network nodes 206-210 discussed above. For example, the server rack 204 may include power components to facilitate distribution of and uninterrupted power to the various server nodes. For example, in one or more embodiments, the server rack 204 includes one or more power distribution units (PDUs) to provide power to the sets of server nodes. In one or more embodiments, the server rack 204 includes one or more rack managers for managing various aspects of operation of the respective server nodes. For instance, the rack manager may execute instructions associated with fragmentation of storage and/or computing resources and ensure that workloads are evenly distributed across multiple server nodes. The rack manager may additionally receive and implement various upgrades to the server nodes after the server rack 204 has been deployed on an edge network. The rack manager may further manage power consumption and power throttling features on the respective server nodes.

As noted above, the pre-provisioning system 106 can pre-provision the server nodes 206-210 of the server rack 204 preparatory to being deployed on an edge network. In particular, based on collected information about the edge network (e.g., location information, network identifiers, network specifications), the pre-provisioning system 106 can identify one or more control planes 212 to service one or more of the server nodes 206-210 on the server rack 204. As shown in FIG. 2A, the pre-provisioning system 106 can identify any number of control planes 212 tasked with managing services to be hosted by the respective server nodes 206-210.

In one or more embodiments, the pre-provisioning system 106 can identify a control plane to manage each of the respective types of server nodes 206-210. For example, the pre-provisioning system 106 can identify a first control plane to manage the set of storage nodes 206 and a second control plane to manage the set of compute nodes 208. In one or more embodiments, the pre-provisioning system 106 identifies one or more control planes to manage respective services (e.g., virtual machines, containers) of various types hosted on one or more of the server nodes 206-210.

In one or more embodiments, the pre-provisioning system 106 pre-provisions the server rack 204 by establishing a connection with the control plane(s) 212 to ensure that the server nodes 206-210 operate as designed within the hierarchy of the datacenter 202. In particular, the pre-provisioning system 106 may cause each of the server nodes 206-210 to be exposed to one or more control planes 212 to enable the control plane(s) 212 to implement one or more configurations on the respective server nodes 206-210. In this way, the control plane(s) 212 may verify that each of the server nodes 206-210 are functional and healthy within the framework of the internal network of the regional datacenter 202. Further, the control plane(s) 212 may store information that enables the control plane(s) 212 to re-establish the connection after the server rack 204 has been re-located to a location of the edge zone and upon attempting to reconnect via an external network.

As shown in FIG. 2A, while a connection may be established between the server nodes 206-210 and the control plane(s) 212, the pre-provisioning system 106 may prevent exposure of the server resources to any allocation engine(s) 214 on the regional datacenter 202. In particular, as part of the process of pre-provisioning the server rack 204 and configuring the hardware and various systems on the respective server nodes 206-210, the pre-provisioning system 106 may additionally prevent any services from being prematurely deployed on the server rack 204 by preventing any of the server nodes 206-210 from being exposed to the allocation engine(s) 214.

As shown in FIG. 2A, the pre-provisioning system 106 may nonetheless prepare for allocation of resources on the server rack 204 after deployment of the server rack 204 at an edge zone. For example, as shown in FIG. 2A, the control plane(s) 212 can communicate information about the server rack 204 and/or the edge zone to the allocation engine(s) 214 to ensure that the allocation engine(s) 214 is aware of the association between the edge zone and the resource capacity on the server rack 204. In this way, after eventual exposure of the server rack 204 to the allocation engine(s) 214, the allocation engine(s) 214 may ensure that service requests received from clients associated with the edge network are serviced correctly by selectively allocating computing resources on the server nodes 206-210 of the server rack 204.

After establishing the connection between the server rack 204 and the control plane(s) 212 and after performing any number of health checks and validations to ensure that the hardware of the server rack 204 performs as designed within the internal network hierarchy of the regional datacenter 202, the server rack 204 may be disconnected from the internal network (e.g., disconnected from the control plane(s) 212) and re-located to another location corresponding to an edge network. For example, as shown in FIG. 2B, the server rack 204 may be transported or otherwise re-located to an edge zone 216.

As mentioned above, the edge zone 216 may be located close to or within a predetermined distance of the regional datacenter 202. Indeed, in one or more embodiments, the regional datacenter 202 may be selected based on the expected location of the edge zone 216. For example, where a country includes a first datacenter for a western region of the country and a second datacenter for an eastern region of the country and where an edge zone corresponding to a hardware deployment request is located in the western portion of the country, the first datacenter may be selected as the regional datacenter 202 for pre-provisioning the server rack 204.

Indeed, in one or more embodiments, the second datacenter may be incapable of servicing the edge zone where the edge zone would be serviced by components on the first datacenter. This may be the result of the pre-provisioning process on the first datacenter in which control plane(s) unique to the first datacenter are used to establish functionality and verify health of the server nodes within the internal framework of the first datacenter.

As shown in FIG. 2B, the server rack 204 having the pre-provisioned server nodes 206-210 thereon may be moved to a location of an edge zone 216 to service any number of client devices 218a-n via an external network 220. In one or more embodiments, the server rack 204 is deployed on the external network 220 of the edge zone by implementing the server rack 204 within an existing network of server devices within the edge zone 216.

Upon transporting the server rack 204 to the location of the edge zone 216 and connecting the server rack 204 to the external network 220, the server rack 204 may undergo a series of verifications and checks to ensure that the server rack 204 is operational and will function in the same way as when previously connected to the control plane(s) 212 of the regional datacenter 202. For example, a rack manager may facilitate running a plurality of connection checks to ensure that none of the hardware become disconnected as a result of physically transporting the server rack 204. The rack manager may additionally run a number of scripts to ensure that all of the systems are operating as designed.

After performing any number of verifications and health checks to ensure that the server rack is in a similar state as when the server rack was disconnected from the control plane(s) 212, the server nodes 206-210 may be exposed to the allocation engine(s) 214 after getting reconnected to the control plane(s) 212 via the external network 220. At this point, the client devices 218a-n may submit requests to the cloud computing system to be serviced by the server nodes 206-210 on the server rack 204. In particular, because the server rack 204 has been pre-provisioned on the regional datacenter 202, and because the control plane(s) 212 and allocation engine(s) 214 have been pre-configured to process requests originating from client devices 218a-n associated with the external network 220 of the edge zone 216, any requests for virtual machines and other cloud-based services will result in allocation of cloud resources on the respective server nodes 206-210 of the server rack 204.

In one or more embodiments, one or more monitoring alerts will be surprised on the server rack 204 for a period of time. For instance, during a time between disconnecting and reconnecting the server rack to the control plane(s) 212, all monitoring alerts may be suppressed. Suppressing monitoring alerts in this many can significantly reduce a load on the pre-provisioning system 106 caused by expected and known alerts.

In one or more embodiments, pre-provisioning the server rack in accordance with examples described herein may result in fast-tracking service requests originating from the client devices 218a-n. For example, because the pre-provisioning stage may involve storing network, and other edge zone data accessible and control plane(s) 212, after turning capacity live on server nodes 206-210 on customer site, requests originating from the edge zone 216 may be processed by allocating computing resources on the server nodes 206-210 by following the same allocation model when processing similar requests received from client devices that access the cloud computing system via public networks.

Indeed, because the server nodes 206-210 include hardware that is dedicated exclusively to customers associated with the edge zone 216, the allocation engine(s) 214 may fast track any service requests by immediately allocating computing resources on any of the server nodes based on resource availability. Further, by allocating resources on the server rack 204 known to correspond to the edge zone 216 of requesting client devices (e.g., client devices 218a-n), the allocation engine(s) 214 may ignore calculations or estimations of latency on other internal server nodes (e.g., server nodes internally implemented within the datacenter) based on a determination that the server nodes 206-210 will provide much faster latency than any eligible computing resources located on the regional datacenter 202.

Figure 3:
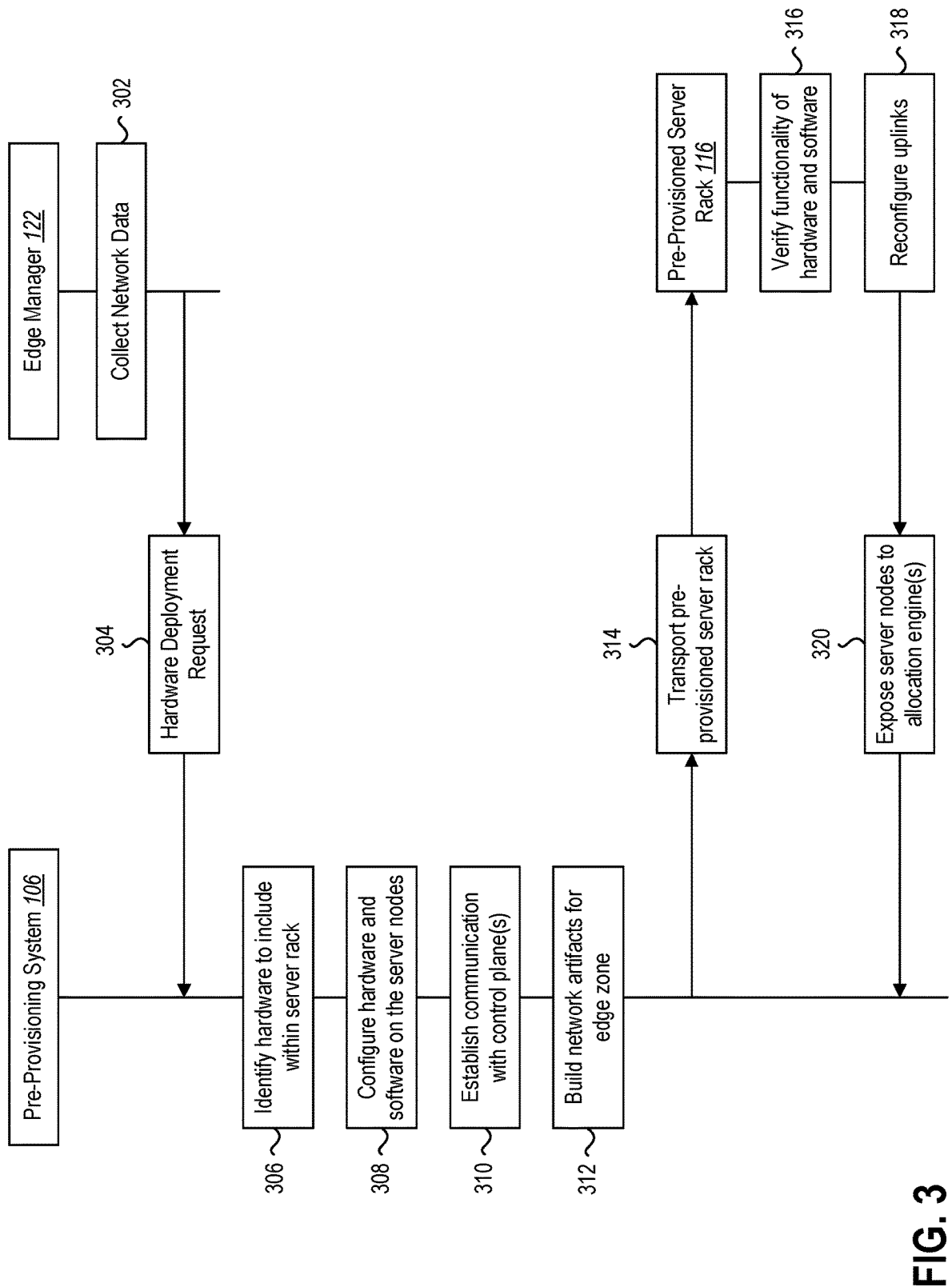
FIG. 3 illustrates an example flow diagram showing an implementation of pre-provisioning and deploying a server rack via a local edge network in accordance with one or more embodiments.

FIG. 3 illustrates additional detail in connection with pre-provisioning a server rack in accordance with one or more embodiments described herein. For example, FIG. 3 illustrates an example workflow including a pre-provisioning system 106 and an edge manager 122 to facilitate pre-provisioning a server rack on a warehouse-side of a cloud-computing system (e.g., on an internal network of a datacenter) and deploying the pre-provisioned server rack on an edge-side of the cloud computing system (e.g., on an external network of an edge zone).

As shown in FIG. 3, the edge manager 122 may perform an act 302 of collecting network data associated with an edge zone. The network data may include any information associated with a client/customer and/or the network on which a server rack is to be implemented. For example, the network data may include an edge zone identifier, a customer identifier, a network identifier, information about a network and/or devices on the network, a location of an edge network (e.g., a geographical location), an identifier of a datacenter capable of servicing the edge zone, and any other information that may be used in establishing a connection between devices on the edge network and the cloud computing system.

In one or more embodiments, the edge manager 122 performs an act 304 of providing a hardware deployment request to the pre-provisioning system 106. The hardware deployment request may include any of the collected information about the network and/or devices on the network. In addition, the hardware deployment request may include an indication of a quantity of computing, storage, and/or bandwidth resources that a customer wants to deploy within an edge zone. In one or more embodiments, the edge manager 122 provides the hardware deployment request based on information filled out by an administrator of the edge manager 122 via a graphical user interface provided by the pre-provisioning system 106. This may involve providing a template or other electronic form that a user of the edge manager 122 may fill out to indicate computing/storage preferences (e.g., resource quantities, virtual machine types), network information, and other information to facilitate creation of the pre-provisioned hardware.

Responsive to the hardware deployment request, the pre-provisioning system 106 can perform a series of acts as part of a pre-provisioning phase. For example, the pre-provisioning system 106 can perform an act 306 of identifying hardware to include within the pre-provisioned server rack. For example, the pre-provisioning system 106 may identify any number of server nodes including a set of storage nodes, a set of compute nodes, and a set of network nodes to include within a housing of the server rack. The pre-provisioning system 106 may additionally identify specific SKUs for the respective server nodes. In one or more embodiments, the pre-provisioning system 106 identifies the server nodes of specific types based on the information received via the hardware deployment request.

As shown in FIG. 3, the pre-provisioning system 106 can further pre-provision the server rack by performing an act 308 of configuring hardware and software on the server nodes in a warehouse or internal location before exposing the hardware to the customer. For example, the pre-provisioning system 106 can install and configure operating systems on each of the server nodes. The pre-provisioning system 106 may additionally configure the hardware by installing firmware and other programs that facilitate communication with the server nodes. In each of the above examples, the pre-provisioning system 106 may configure the hardware and/or software based on specifications of the edge network.

The pre-provisioning system 106 may further pre-provision the server rack by performing an act 310 of establishing communication with one or more control planes. The pre-provisioning system 106 may establish communication with any number of control planes. For example, the pre-provisioning system 106 may establish communication between each server node and a corresponding control plane within the datacenter. In one or more embodiments, the pre-provisioning system 106 establishes communication with each of multiple control planes based on corresponding services (e.g., virtual machines, containers) that may be hosted on the respective server nodes.

In one or more embodiments, establishing communication with the control plane(s) involves modeling the server rack on the control planes. This may involve providing information to the control planes that enables the control plane to recognize the respective server nodes after deployment of the server rack on the edge zone. Indeed, the control planes may store a record including mapping information that enables the control planes to verify an identity of the server nodes after deployment of the server rack on the edge zone.

In one or more embodiments, the pre-provisioning system 106 may perform an act 312 of building one or more network artifacts. For example, the pre-provisioning system 106 may establish one or more virtual private networks (VPNs) through which hardware on the server rack can communicate with components via the internet network of the datacenter. In particular, the pre-provisioning system 106 may establish any number of VPNs that enable the server rack to directly communicate with components on the datacenter after the server rack is deployed on an external network. This enables the server rack to emulate internal connections even where the server rack is part of an edge network that is connected to the datacenter via an external network.

As an illustrative example, after the edge manager 122 performs the act 304 of providing a hardware deployment request to the pre-provisioning system 106, in one or more embodiments, a series of modeling steps that involve the creation of new artifacts scoped to reconfigure network uplinks and other network devices on the external network may be performed. In one or more embodiments, these artifacts may refer to extensible markup (xml) files and scripts that may be executed on the external network devices to bring connectivity up between the edge zone and regional datacenter. Preparing these artifacts in advance by the pre-provisioning system 106 will compress the execution time on customer site while bringing the edge zone up on the external network.

As noted above, the pre-provisioning system 106 can perform the above acts 306-312 and any additional acts associated with pre-provisioning the hardware of the server rack without exposing the server nodes to an allocation engine. For example, the pre-provisioning system 106 can perform any number of pre-provisioning acts to transition the server nodes of the server rack to a return to web (RTW) state, which may refer to a state of the server nodes in which the server nodes are functional within the framework of the datacenter, but where the server nodes have not been exposed to one or more allocation engines. In one or more embodiments, the control plane(s) may communicate modeling information and/or artifact information to the allocation engine(s) to enable the allocation engine(s) to recognize the server nodes after deployment on the edge-network without ever exposing the server nodes to the allocation engine(s). Indeed, the pre-provisioning system 106 may perform each of the above acts without making any of the server nodes available for deployment of various services thereon prior to transporting the server rack to the location of the edge zone and re-establishing communication between the server nodes and the control plane(s).

As shown in FIG. 3, the pre-provisioning system 106 can facilitate an act 314 of transporting the pre-provisioned server rack to a location of the edge zone. As noted above, this may involve powering down the server rack and transitioning the server rack to an "out for repair" state. The act 314 may further include physically transporting 'securely' the server housing and associated hardware to a location of the customer to be connected to the cloud computing system via an external network. As discussed above, the resulting edge zone may include the server rack and one or more additional components (e.g., additional servers, edge manager 122, and client devices) that will be provided access to the server nodes on the pre-provisioned server rack 116.

As shown in FIG. 3, after transporting the server rack 116 to a location of the edge zone, an act 316 of verifying functionality of hardware and software on the server rack 116 may be performed. In one or more embodiments, a rack manager (or edge manager 122) may run one or more scripts to diagnose any hardware and/or software malfunctions on the server rack 116. This may involve identifying any changes in a state of the hardware of software as a result of transporting the server rack from the datacenter to a location of the edge zone.

Additional workflows and features may be executed on the server rack 116 at the location of the edge zone to make sure the hardware is physically healthy and ready for customer workload such as running a non-disruptive wire check workflow in which backend cabling, power, network, serial wires health, and other functional checks and performance requirements are performed. In the case of successful health checks, another workflow will start to drive the server nodes from the Out of Repair (OFR) state to a Production state in preparation for hosting virtual machines and other customer loads. When a server node is marked as unhealthy, it may be sent to a diagnostics workflow to further diagnose the root cause of the issue.

In one or more embodiments, the act 316 of verifying functionality of the hardware and software involves running a series of scripts corresponding to different verifications that the server rack is operating as intended. For example, in one or more embodiments, the server rack (e.g., a rack manager, edge manager 122) runs a series of checks of a configuration phase. This involves checking that the server nodes (e.g., server blades) are "in out for repair" states corresponding to a state when transport of the server rack from the datacenter was initiated. The server rack may then check if any cables or blades are faulty as a result of being disconnected or other issue. After this, the server rack can discover/set a media access control (MAC) address to initiate setting up communication between the server nodes and other devices via an external network of the edge zone.

After the configuration phase and setting up the communication network, the server rack may be restored to the RTW state and perform a series of acts of a certification stage. The certification stage may involve initiating the server blades and performing one or more functional checks and performance checks. Where there are potential hardware issues, the server rack may run diagnostic scripts on the server nodes and service those issues.

While still in the RTW stage, the server rack may perform acts of a validation phase. The validation phase may include firmware validations, security validations, and other scripts that validate various functionalities of the server nodes. Similar to the certification stage, where potential issues are identified, the server rack may run diagnostic scripts and service any identified validation issues.

After performing some or all of the above checks to verify that the server rack is operational and the network components are up and running, the server rack may proceed to transition to a production state. As shown in FIG. 3, this may involve performing an act 318 of reconfiguring uplinks between the server rack 116 and the datacenter. For example, the server rack 116 may reconfigure any network artifacts previously pre-provisioned prior to transporting the server rack to the edge location. In addition, and as shown in FIG. 3, the server rack 116 may initiate operation of the server nodes and perform an act 320 of exposing the server nodes of the server rack to the allocation engine(s) on the datacenter. As discussed above, once the server nodes are live, the allocator engine(s) may begin to allocate computing resources on the server rack responsive to customer requests received by client devices associated with the edge zone.

Figure 4:
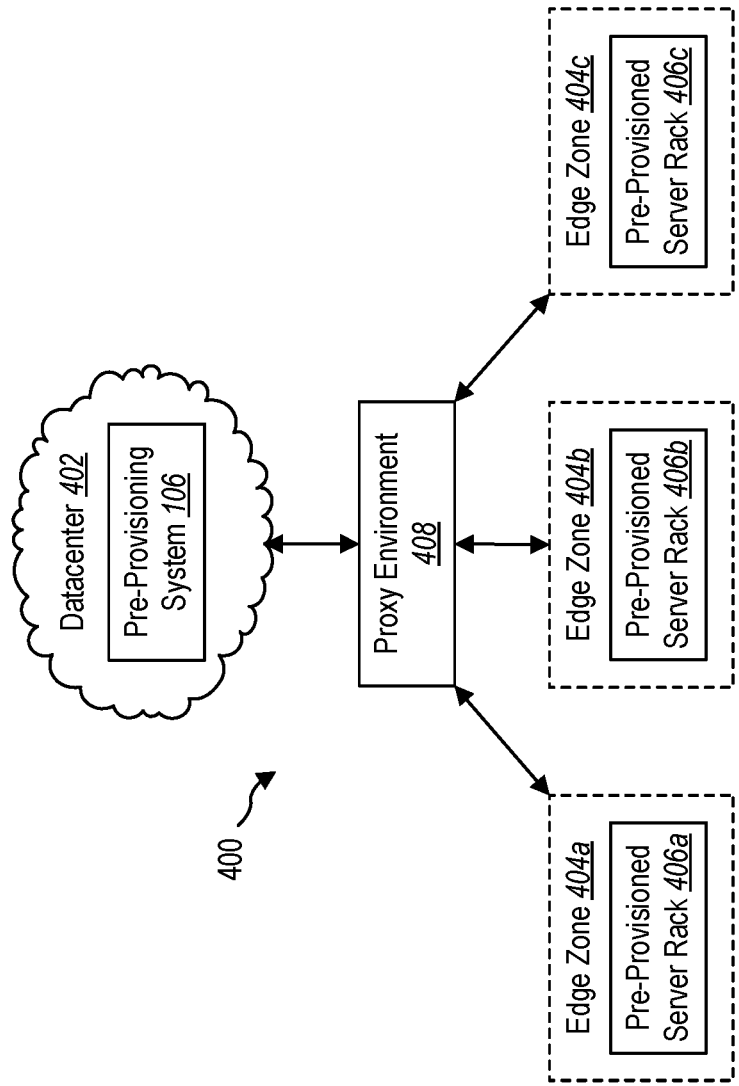
FIG. 4 illustrates an example environment showing a verification system on a proxy server for verifying a pre-provisioned server rack in accordance with one or more embodiments.

In one or more embodiments, the pre-provisioning system 106 may implement one or more additional security features to ensure that the pre-provisioned server racks are not used in a way that jeopardizes security of assets on the cloud computing system. For example, FIG. 4 illustrates an example environment 400 including a datacenter 402 having a pre-provisioning system 106 implemented thereon and in communication with a plurality of edge zones 404a-c. As further shown, each of the edge zones 404a-c have pre-provisioned server racks 406a-c. The pre-provisioned server racks 406a-c may have similar features and functionality as one or more embodiments described herein.

As additionally shown in FIG. 4, the environment 400 may include a proxy environment 408 (e.g., a proxy server) tasked with verifying an identity of the edge zones 404a-c and pre-provisioned server racks 406a-c prior to establishing communication with one or components on the internal network of the datacenter 402. For example, as part of the pre-provisioning process, the pre-provisioning system 106 may provide information about the edge zones 404a-c to use in verifying that the pre-provisioned server racks 406a-c are located at the respective edge zones 404a-c after the server racks 406a-c are restored to the RTW stage. After verifying that the pre-provisioned server racks 406a-c are at the correct locations, the proxy environment 408 may grant access to the control planes and allocation engines on the datacenter 402. The function of the proxy system may continue to operate after provisioning and during operational activities to protect the regional cloud services from any possible compromised edge zone(s). Indeed, where an edge zone later becomes compromised, the proxy environment 408 may cause the edge zone to go into a quarantine mode responsive to detecting any malicious activity.

Figure 5:
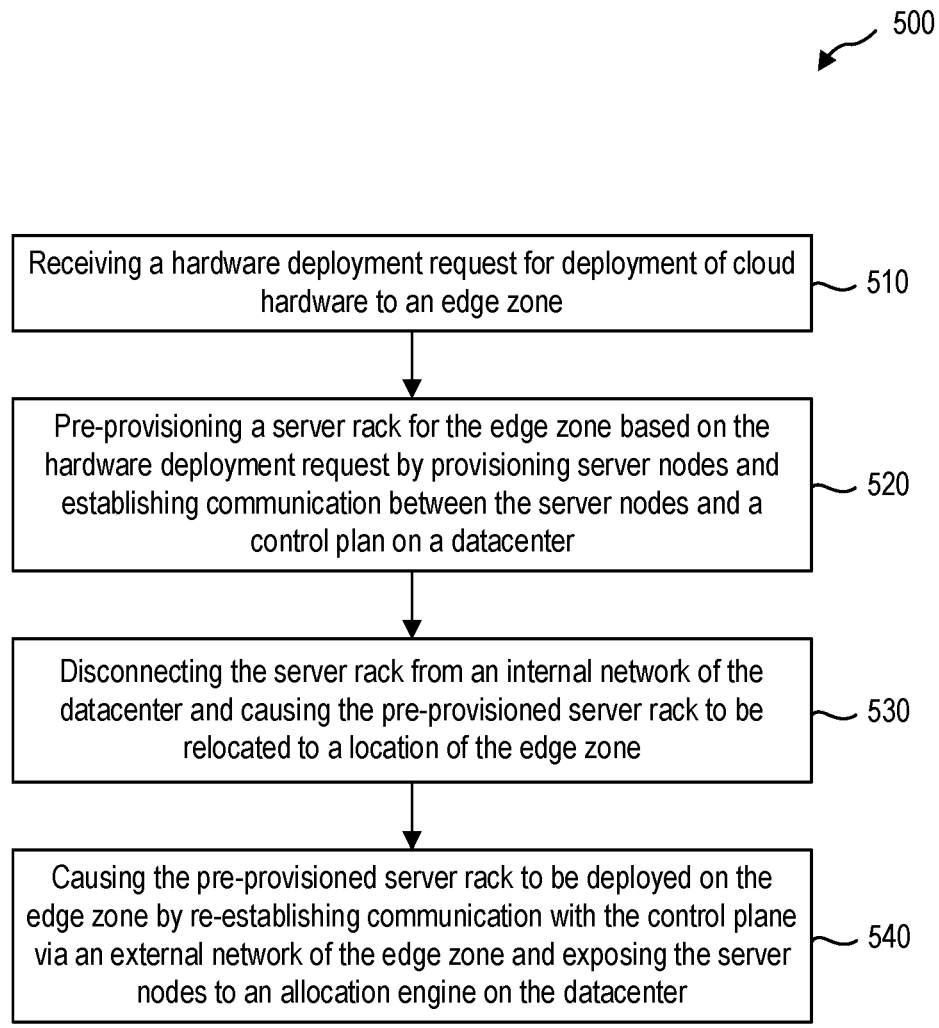
FIG. 5 illustrates an example series of acts for pre-provisioning server hardware for deployment on a local edge network in accordance with one or more embodiments.

Turning now to FIG. 5, this figure illustrates an example flowchart including a series of acts for pre-provisioning and deploying a server rack on an edge zone in accordance with one or more embodiments. While FIG. 5 illustrate acts according to one or more embodiments, alternative embodiments may omit, add to, reorder, and/or modify any of the acts shown in FIG. 5. The act of FIG. 5 can be performed as part of a method. Alternatively, a non-transitory computer-readable medium can include instructions that, when executed by one or more processors, cause a computing device to perform the acts of FIG. 5. In still further embodiments, a system can perform the act of FIG. 5.

FIG. 5 shows a series of acts 500 for pre-provisioning and deploying a server rack on an edge zone in accordance with one or more embodiments described herein. As shown in FIG. 5, the series of acts 500 includes an act 510 of receiving a hardware deployment request for deployment of cloud hardware to an edge zone. For example, in one or more embodiments, the act 510 involves receiving a hardware deployment request for deployment of cloud hardware to an edge zone associated with a datacenter of a cloud computing system.

In one or more embodiments, the hardware deployment request includes customer information associated with the edge zone. The customer information may include location information associated with a geographic location of the edge zone and network information associated with the external network on which the pre-provisioned server rack is to be deployed. In one or more embodiments, the hardware deployment request includes an identification of one or more virtual machines to be deployed on the pre-provisioned server rack by client devices of the edge zone. Further in one or more embodiments, the one or more server node types of the plurality of server nodes are determined based on the identification of the one or more virtual machines included within the hardware deployment request.

As further shown, the series of acts 500 includes an act 520 of pre-provisioning a server rack for the edge zone based on the hardware deployment request by provisioning server nodes and establishing communication between the server nodes and a control plane on a datacenter. For example, in one or more embodiments, the act 520 involves pre-provisioning a server rack for the edge zone associated with the datacenter of the cloud computing system based on the hardware deployment request where pre-provisioning the server rack includes provisioning a plurality of server nodes and establishing communication between the plurality of server nodes and one or more control planes on the datacenter via an internal network of the datacenter.

As further shown, the series of acts 500 includes an act 530 of disconnecting the server rack from an internal network of the datacenter and causing the pre-provisioned server rack to be relocated to a location of the edge zone. As further shown, the series of acts 500 includes an act 540 of causing the pre-provisioned server rack to be deployed on the edge zone by re-establishing communication with the control plane via an external network of the edge zone and exposing the server nodes to an allocation engine on the datacenter. For example, in one or more embodiments, the act 540 involves causing the pre-provisioned server rack to be deployed via a location of the edge zone where deploying the pre-provisioned server rack includes re-establishing communication with the one or more control planes via an external network associated with the edge zone and exposing the plurality of server nodes to an allocation engine on the datacenter. In one or more embodiments, deploying the pre-provisioned server rack includes performing a series of verifications prior to exposing the plurality of server nodes to the allocation engine on the datacenter.

In one or more embodiments, pre-provisioning the server rack includes, prior to causing the pre-provisioned server rack to be relocated to the location of the edge zone, installing firmware on the set of storage nodes and the set of computing nodes, initiating operating systems on the set of storage nodes and the set of computing nodes, and verifying a health status of each server node from the plurality of server nodes.

In one or more embodiments, pre-provisioning the server rack includes providing instructions to the one or more control planes indicating that the server rack is to be deployed via the external network. In one or more implementations, the instructions include verification information to enable the one or more control planes to verify an identity of the plurality of server nodes at the location of the edge zone when booted up and connected to the external network associated with the edge zone.

In one or more embodiments, pre-provisioning the server rack includes building network artifacts for the server rack. In one or more implementations, the network artifacts include one or more virtual private networks (VPNs) through which the sets of hardware can communicate with components on the datacenter via the external network associated with the edge zone.

In one or more embodiments, pre-provisioning configuring the plurality of server nodes for communication with the one or more control planes without exposing any server nodes from the plurality of server nodes to an allocation engine on the datacenter. In one or more implementations, the allocation engine is configured to allocate computing resources on the plurality of server nodes responsive to one or more virtual machine deployment requests received from a client device on the external network.

In one or more embodiments, the plurality of server nodes includes a set of storage nodes and a set of compute nodes. In one or more embodiments, the allocation engine is configured to receive virtual machine requests from one or more client devices on the external network and allocate one or more of storage capacity on the set of storage nodes and compute capacity on the set of compute nodes responsive to the virtual machine requests.

In one or more embodiments, the series of acts 500 includes establishing a proxy server node as an entry point between the edge zone and the control plane of the cloud computing system. In one or more implementations, the proxy server node is configured to verify that the pre-provisioned server node is connected to the external network of the edge zone corresponding to the edge zone identified via the hardware deployment request.

Figure 6:
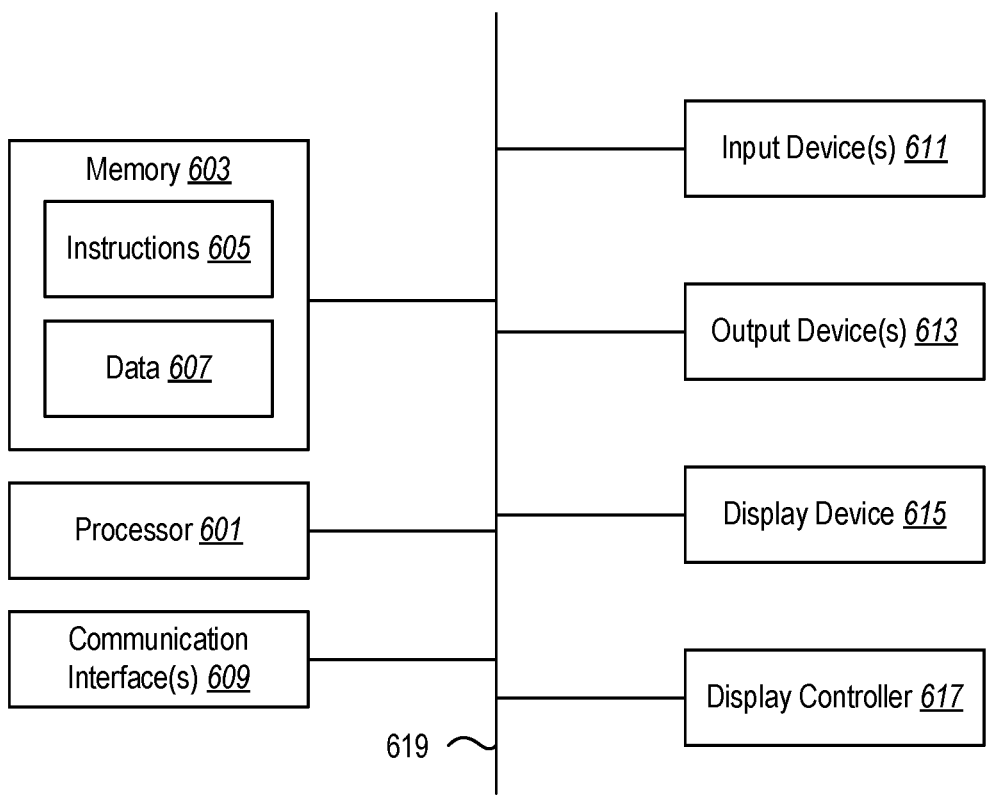
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method, comprising:
receiving a hardware deployment request for deployment of cloud hardware to an edge zone associated with a datacenter of a cloud computing system;
pre-provisioning a server rack for the edge zone associated with the datacenter of the cloud computing system based on the hardware deployment request, wherein pre-provisioning the server rack includes provisioning a plurality of server nodes and establishing communication between the plurality of server nodes and one or more control planes on the datacenter via an internal network of the datacenter;
disconnecting the pre-provisioned server rack from the internal network of the datacenter and causing the pre-provisioned server rack to be relocated to a location of the edge zone; and
causing the pre-provisioned server rack to be deployed at the location of the edge zone, wherein deploying the pre-provisioned server rack includes re-establishing communication with the one or more control planes via an external network associated with the edge zone and exposing the plurality of server nodes to an allocation engine in the datacenter to enable the one or more control planes to implement one or more configurations on the respective server nodes.

2. The method of claim 1, wherein the hardware deployment request includes customer information associated with the edge zone, the customer information including location information associated with a geographic location of the edge zone and network information associated with the external network on which the pre-provisioned server rack is to be deployed.

3. The method of claim 1, wherein pre-provisioning the server rack includes, prior to causing the pre-provisioned server rack to be relocated to the location of the edge zone, installing firmware on the plurality of server nodes, initiating operating systems on the plurality of server nodes, and verifying a health status of each server node from the plurality of server nodes.

4. The method of claim 1, wherein pre-provisioning the server rack includes providing instructions to the one or more control planes indicating that the pre-provisioned server rack is to be deployed via the external network, wherein the instructions include verification information to enable the one or more control planes to verify an identity of the plurality of server nodes at the location of the edge zone when booted up and connected to the external network associated with the edge zone.

5. The method of claim 1, wherein pre-provisioning the server rack includes building network artifacts for the plurality of server nodes, the network artifacts including one or more virtual private networks (VPNs) through which the plurality of server nodes can communicate with components of the datacenter via the external network associated with the edge zone.

6. The method of claim 1, wherein pre-provisioning the server rack includes configuring the plurality of server nodes for communication with the one or more control planes without exposing any server nodes from the plurality of server nodes to an allocation engine in the datacenter, the allocation engine being configured to allocate computing resources on the plurality of server nodes responsive to one or more virtual machine deployment requests received from a client device on the external network.

7. The method of claim 1, wherein the hardware deployment request includes an identification of one or more virtual machines to be deployed on the pre-provisioned server rack by client devices of the edge zone, and wherein one or more server node types of the plurality of server nodes are determined based on the identification of the one or more virtual machines included within the hardware deployment request.

8. The method of claim 1, wherein deploying the pre-provisioned server rack includes performing a series of verifications prior to exposing the plurality of server nodes to the allocation engine in the datacenter.

9. The method of claim 1, wherein the plurality of server nodes includes a set of storage nodes and a set of compute nodes, wherein the allocation engine is configured to:
receive virtual machine requests from one or more client devices on the external network; and
allocate one or more of storage capacity on the set of storage nodes and compute capacity on the set of compute nodes responsive to the virtual machine requests.

10. The method of claim 1, further comprising establishing a proxy server node as an entry point between the edge zone and the control plane of the cloud computing system, the proxy server node being configured to verify that the pre-provisioned server rack is connected to the external network of the edge zone corresponding to the edge zone identified via the hardware deployment request.

11. A system, comprising:
one or more processors;
memory in electronic communication with the one or more processors; and
instructions stored in the memory, the instructions being executable by the one or more processors to:
receive a hardware deployment request for deployment of cloud hardware to an edge zone associated with a datacenter of a cloud computing system;
pre-provision a server rack for the edge zone associated with the datacenter of the cloud computing system based on the hardware deployment request, wherein pre-provisioning the server rack includes provisioning a plurality of server nodes and establishing communication between the plurality of server nodes and one or more control planes on the datacenter via an internal network of the datacenter;
disconnect the pre-provisioned server rack from the internal network of the datacenter and causing the pre-provisioned server rack to be relocated to a location of the edge zone; and cause the pre-provisioned server rack to be deployed at the location of the edge zone, wherein deploying the pre-provisioned server rack includes re-establishing communication with the one or more control planes via an external network associated with the edge zone and exposing the plurality of server nodes to an allocation engine in the datacenter to enable the one or more control planes to implement one or more configurations on the respective server nodes.

12. The system of claim 11, wherein pre-provisioning the server rack includes, prior to causing the pre-provisioned server rack to be relocated to the location of the edge zone, installing firmware on the plurality of server nodes, initiating operating systems on the plurality of server nodes, and verifying a health status of each server node from the plurality of server nodes.

13. The system of claim 11, wherein pre-provisioning the server rack includes providing instructions to the one or more control planes indicating that the pre-provisioned server rack is to be deployed via the external network, wherein the instructions include verification information to enable the one or more control planes to verify an identity of the plurality of server nodes at the location of the edge zone when booted up and connected to the external network associated with the edge zone.

14. The system of claim 11, wherein pre-provisioning the server rack includes building network artifacts for the plurality of server nodes, the network artifacts including one or more virtual private networks (VPNs) through which the plurality of server nodes can communicate with components of the datacenter via the external network associated with the edge zone.

15. The system of claim 11, wherein pre-provisioning the server rack includes configuring the plurality of server nodes for communication with the one or more control planes without exposing any server nodes from the plurality of server nodes to an allocation engine in the datacenter, the allocation engine being configured to allocate computing resources on the plurality of server nodes responsive to one or more virtual machine deployment requests received from a client device on the external network.

16. The system of claim 11, further comprising instructions being executable by the one or more processors to establish a proxy server node as an entry point between the edge zone and the control plane of the cloud computing system, the proxy server node being configured to verify that the pre-provisioned server rack is connected to the external network of the edge zone corresponding to the edge zone identified via the hardware deployment request.

17. A non-transitory computer readable medium storing instructions thereon that, when executed by at least one processor, causes a computing device to:

receive a hardware deployment request for deployment of cloud hardware to an edge zone associated with a datacenter of a cloud computing system;

pre-provision a server rack for the edge zone associated with the datacenter of the cloud computing system based on the hardware deployment request, wherein pre-provisioning the server rack includes provisioning a plurality of server nodes and establishing communication between the plurality of server nodes and one or more control planes on the datacenter via an internal network of the datacenter;

disconnect the pre-provisioned server rack from the internal network of the datacenter and causing the pre-provisioned server rack to be relocated to a location of the edge zone; and cause the pre-provisioned server rack to be deployed at the location of the edge zone, wherein deploying the pre-provisioned server rack includes re-establishing communication with the one or more control planes via an external network associated with the edge zone and exposing the plurality of server nodes to an allocation engine in the datacenter to enable the one or more control planes to implement one or more configurations on the respective server nodes.

18. The non-transitory computer readable medium of claim 17, wherein pre-provisioning the server rack includes, prior to causing the pre-provisioned server rack to be relocated to the location of the edge zone, installing firmware on the plurality of server nodes, initiating operating systems on the plurality of server nodes, and verifying a health status of each server node from the plurality of server nodes.

19. The non-transitory computer readable medium of claim 17, wherein pre-provisioning the server rack includes providing instructions to the one or more control planes indicating that the pre-provisioned server rack is to be deployed via the external network, wherein the instructions include verification information to enable the one or more control planes to verify an identity of the plurality of server nodes at the location of the edge zone when booted up and connected to the external network associated with the edge zone.

20. The non-transitory computer readable medium of claim 17, wherein pre-provisioning the server rack includes building network artifacts for the plurality of server nodes, the network artifacts including one or more virtual private networks (VPNs) through which the plurality of server nodes can communicate with components of the datacenter via the external network associated with the edge zone.

* * * * *